United States Patent [19]

Margulies

[11] Patent Number: 5,046,088
[45] Date of Patent: Sep. 3, 1991

[54] CONVERTER FOR IN-BAND ROUTING AND/OR ORIGINATION INFORMATION

[75] Inventor: Edwin K. Margulies, Solebury, Pa.

[73] Assignee: Dialogic Corporation, Parisppany, N.J.

[21] Appl. No.: 429,849

[22] Filed: Oct. 31, 1989

[51] Int. Cl.$^5$ ............................................. H04M 7/00
[52] U.S. Cl. .................................. 379/211; 379/265; 379/201; 379/231
[58] Field of Search ...................... 379/142, 67, 88, 89, 379/91, 265, 266, 309, 210, 211, 212, 201, 231

[56] References Cited

U.S. PATENT DOCUMENTS

| | | | |
|---|---|---|---|
| 3,111,561 | 11/1963 | Dunning . | |
| 4,696,028 | 9/1987 | Morganstein et al. | 379/88 |
| 4,757,267 | 7/1988 | Riskin | 379/201 |
| 4,797,910 | 1/1989 | Daudelin | 379/88 |
| 4,797,911 | 1/1989 | Salam et al. | 379/67 |
| 4,797,913 | 1/1989 | Kaplan et al. | 379/91 |
| 4,852,149 | 7/1989 | Zwick et al. | 379/67 |
| 4,893,325 | 1/1990 | Pankonen et al. | 379/142 X |

FOREIGN PATENT DOCUMENTS 57-54492 3/1982 Japan .
59-86357 5/1984 Japan .

OTHER PUBLICATIONS

Dialogic Application Note AN007 entitled, "Use of Dialogic T1 Equipment in CPE Gateways", 10-1988.
Dialogic Application Note AN006 entitled, "Use of Dialogic T1 in Telephone Company Networks", 10-1988.

Primary Examiner—James L. Dwyer
Attorney, Agent, or Firm—Michael B. Einschlag

[57] ABSTRACT

An ANI Converter System (ACS): (1) logically interfaces between: (a) a telephone network, on the one hand, and customer premises equipment (CPE), on the other hand, or (b) two portions of a switched telephone network, such as two tandem toll switching machines; (2) accepts incoming calls; (3) extracts in-band network routing and/or origination information such as ANI information; (4) uses the information to extract relevant information from a data base; and (5) places a call to a predetermined called party at, for example, a predetermined workstation to aid operators using the workstation in carrying out transactions with a calling party. The ACS includes a network signalling interface (NSI) for receiving calls from a calling party; a customer premises equipment signalling interface (CPESI) for placing calls to a called party at, for example, a business CPE; a voice and data processing means (VDPM) which is switchably interconnected to the NSI and the CPESI for detecting the in-band network routing and/or origination signals transmitted with the incoming signal from the calling party; a connection and switching means (CSM) for connecting and switching the NSI to either the VDPM or the CPESI and for connecting and switching the VDPM to the CPESI; and a controller for directing the activities of the NSI, CPESI, VDPM and CSM to accept incoming calls, to extract the in-band information, to use the information to extract relevant information from a data base, and to place a call to a predetermined called party.

28 Claims, 3 Drawing Sheets

CONVERTER FOR IN-BAND ROUTING AND/OR ORIGINATION INFORMATION

TECHNICAL FIELD OF THE INVENTION

The present invention pertains to automated telephone communications apparatus for use in telephone communications environments and, in particular, for use in telephone communications environments wherein network routing and/or origination information such as, for example, automatic number identification (ANI) is signalled in-band; the automated telephone communications apparatus being particularly adapted for extracting the in-band information and for presenting it, out-of-band, for use by other apparatus such as, for example, transaction workstations.

BACKGROUND OF THE INVENTION

A telephone communications environment, such as, for example, a network signalling environment or a customer premises equipment (CPE) environment, often interacts with signals in which network routing and/or origination information is signalled in-band. As is well known, such network routing and/or origination information is used in certain applications in call disposition, call billing, and call handling. However, there are many existing telephone communications environments which can transmit and receive signals comprised of such network routing and/or origination information but which cannot detect or utilize such network routing and/or origination information. Such telephone communications environments would benefit from an automated telephone communications apparatus which: (1) logically interfaces between (a) a telephone network, such as, for example, the public switched telephone network (PSTN) or a private network, on the one hand, and customer premises equipment (CPE), such as, for example a digital private business exchange (PBX), on the other hand, or (b) two portions of a switched telephone network, such as, for example, two tandem toll switching machines; (2) automatically accepts incoming calls; (3) extracts in-band network routing and/or origination information such as, for example, ANI information; and (4) presents such information, out-of-band, for use by other apparatus, such as, for example, a workstation, to aid the other apparatus in carrying out transactions with a calling party.

One particular instance of a telephone communications environment which would benefit from the detection and use of such network routing and/or origination information is a high volume telephone communications environment such as a reservations business for a travel agency or an airline where a large number of calls are incoming to the business from the public. A typical such high volume, telephone communications environment is comprised of over 100 in-coming lines and often operates inefficiently because people, such as reservations agents, need to obtain certain information from customers. This interaction with a customer can take time and can create errors. Further, a typical such high volume, telephone communications environment often operates inefficiently because certain customer premises equipment (CPE), such as, for example, a PBX (Private Business Exchange) or an ACD (Automated Call Distributor), does not efficiently distribute incoming telephone calls to particular stations or agent positions.

SUMMARY OF THE INVENTION

Embodiments of the present invention advantageously fill the above-identified need in the art by providing an ANI Converter System (ACS) which: (1) logically interfaces between: (a) a telephone network, such as, for example, the public telephone network (PSTN) or a private network, on the one hand, and customer premises equipment (CPE), such as, for example, a digital private business exchange (PBX), on the other hand, or (b) two portions of a switched telephone network, such as, for example, two tandem toll switching machines; (2) automatically accepts incoming calls; (3) extracts in-band network routing and/or origination information such as, for example, ANI information; and (4) presents such information, out-of-band, for use by other apparatus. In one embodiment of the present invention, the information is used to retrieve information pertaining to the calling party from, for example, a data base, and to obtain therefrom the address of a workstation to which the calling party is to be routed for efficient handling of the call. For example, the embodiment will transfer the calling party to a preferred called party such as, for example, a workstation where a human operator who is particularly suited to handle the incoming call works. In addition, the embodiment may provide information pertaining to the calling party to the workstation over a communications link to aid the workstation or the human operator in carrying out transactions with the calling party. Advantageously, a business environment which has a fixed set of resources such as, for example people and/or phone lines and which utilizes an embodiment of the present invention, can serve a larger number of incoming calling party requests from customers with increased customer satisfaction and with reduced telephone transmission charges because the embodiment of the present invention will reduce and, in some cases, even eliminate, transaction time.

An embodiment of the inventive ACS is particularly adapted for interfacing between a first telephone equipment, such as, for example, a switching machine in the public switched telephone network, and a second telephone equipment, such as, for example, a customer premises equipment, which first telephone equipment outputs a first telephone call signal which is comprised of first in-band network routing and/or origination information. In particular, one such embodiment comprises: at least one network signalling interface for receiving the first telephone call signal in response to commands from a controller means; at least one customer premises equipment signalling interface for sending a second telephone call signal comprised of second in-band network routing and/or origination information to the second telephone equipment in response to commands from the controller means; at least one voice and data processing means which is switchably interconnected to at least one of the at least one network signalling interface and to at least one of the at least one customer premises equipment signalling interface: (a) for detecting the first in-band network routing and/or origination information, (b) for transmitting the first in-band network routing and/or origination information to the controller means, (c) for transmitting audio signals, in response to commands and information sent thereto from the controller means, to at least one of the at least one network signalling interface or to at least one of the at least one customer premises equipment signalling interface, and (d) for transmitting the second in-band network routing and/or origination information sent thereto from the controller means; a connection and switching means, in response to commands from the controller means, for connecting and switching at least one of the at least one network signalling interface to either at least one of the at least one voice and data processing means or at least one of the at least one customer premises equipment signalling interface and for connecting and switching at least one of the at least one voice and data processing means to at least one of the at least one customer premises equipment signalling interface; wherein the controller means comprises means which causes the apparatus: (a) to respond to the first telephone call signal input to one of the at least one network signalling interface and to detect and decode the first in-band network routing and/or origination information by interaction with the one of the at least one network signalling interface, one of the at least one voice and data processing means and the connection and switching means; (b) to obtain the second in-band network routing and/or origination information by retrieving information pertaining to a predetermined portion of the second telephone equipment from a data base system which uses at least a portion of the first in-band network routing and/or origination information as a retrieval key; and (c) to send the second telephone signal which is comprised of the second in-band network routing and/or origination information to the second telephone equipment by interaction with one of the at least one customer premises equipment signalling interface, the one of the at least one voice and data processing means, and the connection and switching means.

In another embodiment of the present invention, the controller means comprises a communications interface for transmitting at least a portion of the information obtained from the data base to remote apparatus such as a work station or to a host computer which transmits the information, in turn, to the workstation.

In still another embodiment of the present invention, the controller means is connected by a communications interface to a host computer The host computer itself contains a data base which is accessed to retrieve information pertaining to the calling party, which information is retrieved using at least a portion of the first in-band information as a retrieval key.

BRIEF DESCRIPTION OF THE DRAWING

A complete understanding of the present invention may be gained by considering the following detailed description in conjunction with the accompanying drawing, in which.

DETAILED DESCRIPTION

Figure 1:
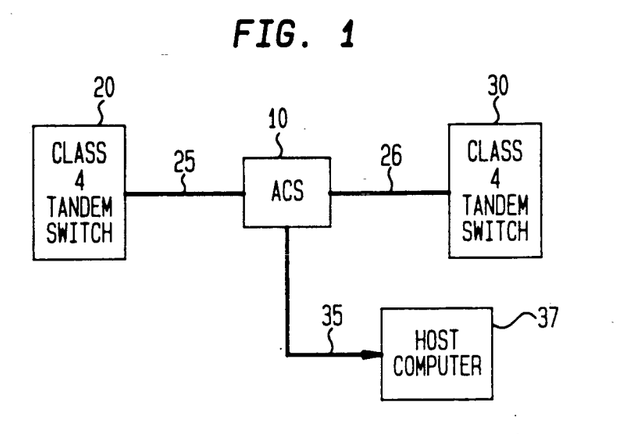
FIG. 1 shows, in pictorial form, the logical placement of an inventive ANI Converter System (ACS) in a tandem switch environment.

FIG. 1 shows the logical placement of ANI Converter System 10 (ACS 10) in a telephone network comprised of class 4 tandem switch 20 and class 4 tandem switch 30. The communications link between class 4 tandem switch 20 and ACS 10 is T1 digital carrier 25 This communications link transmits in-band network routing and/or origination information in the form of, for example, automatic number identification (ANI) information and/or dialed-number-identification-service (DNIS) information, along with regular telephone communcations. ACS 10 detects the in-band ANI information on each channel of T1 digital carrier 25 and transmits it, out-of-band, on a communications link such as, for example, data link 35, to equipment such as, for example, host computer 37. Host computer 37 utilizes the out-of-band information in a manner which will be set forth in detail below to provide ACS 10 with address information for each channel. ACS 10 then accesses the communications link between ACS 10 and class 4 tandem switch 30, i.e., T1 digital carrier 26, and transmits an in-band address on each channel which is determined from the network routing and/or origination information obtained from each channel on T1 digital carrier 25 and from the information transmitted back to ACS 10 from host computer 37 over data link 35. Although, we have shown the telephone network in FIG. 1 to be comprised of class 4 tandem switches 20 and 30, it should be appreciated by those of ordinary skill in the art that this is not meant to limit the environment wherein embodiments of the present invention may be utilized. Specifically, as an illustration, and without limitation, a telephone network which utilizes embodiments of the present invention may be the public switched telephone network (PSTN) or it may be a private network. In either such case, either or both of class 4 tandem switches 20 and 30 may be a toll center switch, an operator service center, an interexchange carrier, a point of presence switch, or any other similarly employed apparatus.

Further, although communications link 25 between class 4 tandem switch 20 and ACS 10 is shown to be a T1 digital carrier and communications link 26 between ACS 10 and class 4 tandem switch 30 is shown to be a T1 digital carrier, it should be appreciated by those of ordinary skill i n the art that this is not meant to limit the type of communications link which is used in connection with embodiments of the present invention to a digital communications link or to one particular type of digital communications link. Specifically, as an illustration, and without limitation, each such communcations link may be any one of a number of digital or analog communications links such as, for example, analog E&M signalling trunks.

Figure 2:
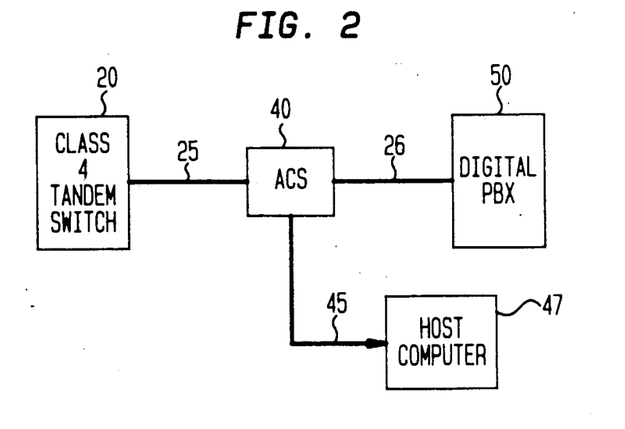
FIG. 2 shows, in pictorial form, the logical placement of an inventive ACS in a business environment.

FIG. 2 shows the logical placement of ACS 40 in a business environment wherein ACS 40 provides an interface between a PSTN comprised of class 4 tandem switch 20, on the one hand, and a business customer premises equipment (business CPE) comprised of digital PBX 50 on the other hand. The communications link between class 4 tandem switch 20 and ACS 40 is T1 digital carrier 25. This communications link transmits in-band network routing and/or origination information in the form of, for example, ANI information and/or DNIS information along with regular telephone communcations. ACS 40 detects the in-band ANI information on each channel of T1 digital carrier 25 and transmits it, out-of-band, on a communications link such as, for example, data link 45, to equipment, such as, for example, host computer 47. Host computer 47 utilizes such information in a manner which will be set forth in detail below to provide ACS 40 with address information. ACS 40 then accesses the communications link between ACS 40 and digital PBX 50, i.e., T1 digital carrier 26, and transmits an in-band address on each channel which is determined from the network routing and/or origination information obtained from each channel on T1 digital carrier 25 and from the information transmitted back to ACS 40 from host computer 47 over data link 45. Although, we have shown the telephone network in FIG. 2 to be comprised of class 4 tandem switch 20, it should be appreciated by those of ordinary skill in the art that this is not meant to limit the environment wherein embodiments of the present invention may be utilized. Specifically, as an illustration, and without limitation, a telephone network which utilizes embodiments of the present invention may be the PSTN or it may be a private network. In either such case, class 4 tandem switch 20 may be a toll center switch, an operator service center, an interexchange carrier, a point of presence switch, or any other similarly employed apparatus. Further, although, we have shown the business CPE in FIG. 2 to be comprised of digital PBX 50, it should be appreciated by those of ordinary skill in the art that this is not meant to limit the environment wherein embodiments of the present invention may be utilized. Specifically, as an illustration, and without limitation, a business environment which utilizes embodiments of the present invention may also be comprised of an automatic call director (ACD) or any other similarly employed apparatus. Finally, although communications link 25 between class 4 tandem switch 20 and ACS 40 is shown to be a T1 digital carrier and communications link 26 between ACS 40 and digital PBX 50 is shown to be a T1 digital carrier, it should be appreciated by those of ordinary skill in the art that this is not meant to limit the type of communications link which is used in connection with embodiments of the present invention to digital communications links or to one particular type of digital communications link. Specifically, as an illustration, and without limitation, each such communcations link may be any one of a number of digital or analog communications links such as, for example, analog E&M signalling trunks FIG. 3 shows a block diagram of ACS 100 fabricated in accordance with the present invention In this embodiment, ACS 100 is connected by lines 120 to the public telephone network (PSTN) and by lines 130 to business customer premises equipment (business CPE) such as, for example, a PBX (Private Business Exchange), an ACD (Automated Call Distributor), or other similar business CPE.

Before we describe the embodiment of inventive ACS 100 in detail and set forth how it provides its inventive functions, we will provide an overview of its general operation. The inventive ACS receives a telephone call signal which is comprised of in-band network routing and/or origination information. The ACS detects and decodes the in-band information and accesses a data base, either local or remote, using at least a portion of the in-band information as a retrieval key to retrieve information pertaining to the calling party and the called party. For example, without limitation, the retrieved information may indicate the calling party name, address, history of prior transactions, the type of transaction, and a particular type of operator to handle the transaction. For example, the in-band information may indicate that the calling party desires to purchase a particular type of product—for example, a multiplicity of incoming "800" number requests may all be routed by the PSTN to a particular business PBX, however, the last four numbers of the telephone number may indicate a specific type of purchase transaction—and, as a result, the retrieved information would correspond to the address at the CPE which handles such transactions and it may also include the address of the next available workstation which handles such transactions. Using the retrieved information, the ACS sends the incoming telephone call signal to the CPE but it inserts new in-band network routing and/or origination information or reroutes the call signal to an address at the CPE so that, as a result, the signal is routed by the CPE to the desired called party.

Figure 3:
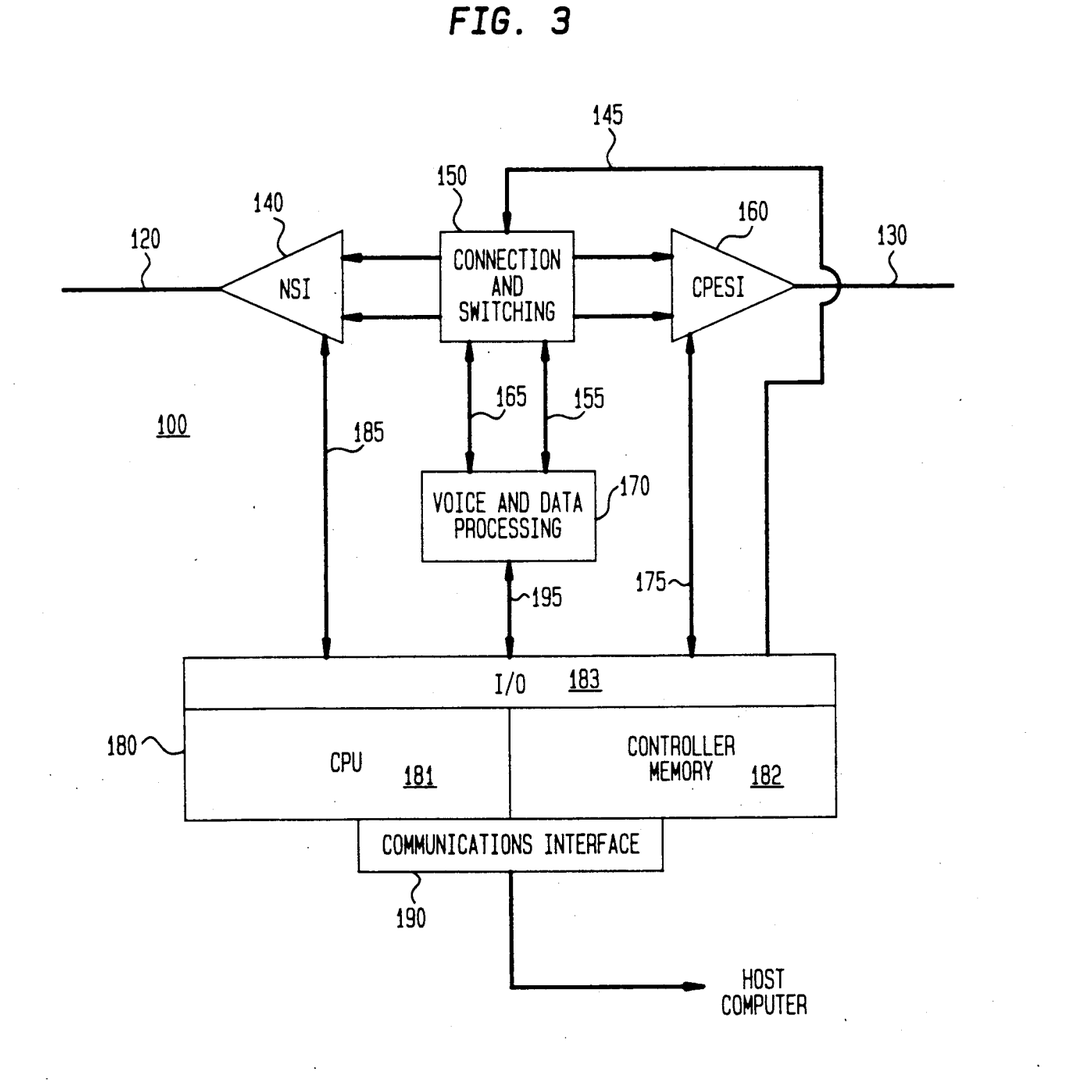
FIG. 3 shows a block diagram of an embodiment of the inventive ACS.

As shown in FIG. 3, ACS 100 is comprised of network signalling interface 140 (NSI 140). NSI 140 provides access over lines 120 from the PSTN to ACS 100. In accordance with the present invention, NSI 140 appears to the PSTN to be physically identical to a business CPE such as, for example, a PBX or an ACD. Further, although NSI 140 may operate on an analog or digital basis, it must be capable of performing the following functions. It must: (1) recognize an incoming request for service from a calling party using the PSTN over lines 120 and be able to report same to controller 180 of ACS 100 over lines 185 and (2) acknowledge a request for service from the PSTN over lines 120 in response to commands transmitted thereto over lines 185 from controller 180. Note that in some embodiments, some of lines 120 may service a single party and/or others of lines 120 may service a multiplicity of parties by means of a multiplex scheme such as that used on a T1 digital carrier Embodiments of NSI 140 are commercially available in the art For example, in a preferred embodiment, one may utilize digital telephony interface DTI/124 or digital telephony interface DTI/100, D4X, and MF/40, all of which are available from Dialogic Corporation, 300 Littleton Road, Parsippany, New Jersey 07054.

As shown in FIG. 3, ACS 100 is further comprised of customer premises equipment signalling interface 160 (CPESI 160). CPESI 160 provides access over lines 130 from ACS 100 to business CPE. In accordance with the present invention, CPESI 160 appears to the CPE such as, for example, a PBX or an ACD, to be physically identical to the PSTN, i.e., CPESI 160 "presents" the PSTN to the business CPE. Further, although CPESI 60 may operate on an analog or digital basis, it must be capable of performing the following functions It must: (1) make a request for service to the business CPE over lines 130 in response to commands transmitted thereto over lines 175 from controller 180 and (2) transmit an in-band destination address, for example, without limitation, a particular extention number into the business CPE over lines 130 in response to commands transmitted thereto over lines 175 from controller 180 and to detect when the business CPE and the called party, for example, a business agent, has answered. Note that in some embodiments, some of lines 130 may service a single party and/or others of lines 130 may service a multiplicity of parties by means of a multiplex scheme such as that used on a T1 digital carrier. Embodiments of CPESI 60 are commercially available in the art. For example, in a preferred embodiment, one may utilize digital telephony interface DTI/124 or digital telephony interface DTI/100, D4X, and MF/40, all of which are available from Dialogic Corporation, 300 Littleton Road, Parsippany, New Jersey 07054.

As shown in FIG. 3, ACS 100 is further comprised of voice and data processing means 170 (VDPM 170). VDPM 170 provides the following functions. It must: (1) generate digitized or synthesized progress tone output signals for transmission to: (a) NSI 140 over lines 165 for ultimate transmission to the PSTN over lines 120 in response to commands from controller 180 over lines 195 and (b) CPESI 160 over lines 155 for ultimate transmission to the business CPE over lines 130 in response to commands from controller 180 over lines 195; (2) detect and decode addressing, i.e., telephone numbers, call progress signals, network routing and/or origination information, and other identification signals, including dual tone multi-frequency signals (DTMF) and multi-frequency tones (MF), which were received from the PSTN over lines 120 and transmitted to VDPM 170 over lines 165 or which were were received from the business CPE over lines 130 and transmitted to VDPM 170 over lines 155 and transmit same to controller 180 over lines 195; (3) code and transmit addressing i.e., telephone numbers network routing and/or origination information, and other identification signals, including DTMF and MF, to CPESI 160 over lines 155 in response to commands from controller 180 over lines 195 for ultimate transmission to the business CPE over lines 130; and (4) optionally, transmit audio announcements to the PSTN or to the business CPE. Embodiments of VDPM 170 are commercially available in the art. For example, in a preferred embodiment, one may utilize voice communication systems DIALOG/41B and MF/40 which are both available from Dialogic Corporation, 300 Littleton Road, Parsippany, New Jersey. Note that the specific number of VDPM's used in a particular embodiment depends on the number of parties one needs to handle.

As shown in FIG. 3, ACS 100 is further comprised of connection and switching means 150 (CSM 150). CSM 150 provides (a) the function of connecting and switching, on an analog or digital basis, individual circuits in NSI 140 to individual voice and data processing circuits within VDPM 170 or to individual circuits within CPESI 160 and (b) the function of connecting and switching, on an analog or digital basis, individual circuits in CPESI 160 to individual voice and data processing circuits within VDPM 170, all in response to commands transmitted thereto over lines 145 from controller 180. Embodiments of CSM 150 are commercially available in the art. For example, in a preferred embodiment, one may utilize a portion of the DTI/124 referred to above to switch by means of time-division multiplex (TDM) switching. The DTI/124 permits switching between a T-1 digital telephony interface input which carries 24 telephone conversations and either an expansion bus on controller 180 which connects, in turn, to CPESI 160 or to any of the voice processing circuits of VDPM 170.

Finally, as shown in FIG. 3, ACS 100 further comprises controller 180. Controller 180, as should be evident from the above, manages and coordinates the activity of the components of ACS 100. Controller 180 comprises the following parts: a central processing unit 181 (CPU 181), memory 182, I/O interfaces 183 and communications interface 190. In addition, controller 180 may optionally further comprise a local data base which is accessed on the basis of network routing and/or origination information such as, for example, ANI information and/or DNIS information, for retrieving information pertaining to the received network routing and/or origination information. Communications interface 190 provides communication of various information to: (a) an external host computer (not shown) which itself may have a data base and/or (b) a workstation (not shown) which is operated in connection with an external host computer and/or a human operator. Specifically, in one embodiment wherein ACS 100 is comprised of a local data base, the information transmitted over communications interface 190 may include either or both ANI and/or DNIS information and information retrieved from the local data base using the ANI and/or the DNIS information, all of which is transmitted in a predetermined format. Further specifically, in another embodiment wherein ACS 100 is not comprised of a local data base, the information transmitted over communications interface 190 may include the ANI and/or the DNIS information in a predetermined format. In a preferred embodiment of the present invention, controller 180 is an IBM compatible personal computer (PC) or similar unit which is commercially available from many sources. In addition, an embodiment of communications interface 190 may be obtained commercially from many sources such as from DCA of Alpharetta, Georgia, AST of Irvine, California and so forth.

Although FIG. 3 shows an embodiment of the inventive ACS which operates as an adjunct between the PSTN which is represented by, for example, a tandem switching machine, and a business environment which is represented by, for example, a digital PBX, embodiments of the inventive ACS may also operate as an adjunct between two portions of the PSTN or a private telephone network. It should be clear to those of ordinary skill in the art that in a latter such environment, CPESI 160 of FIG. 3 would be replaced by an interface which is capable of performing functions which are analogous to the functions that were described above to be performed by CPESI 160, albeit with the specific apparatus of the PSTN or the private telephone network with which the interface is to be made.

Figure 4:
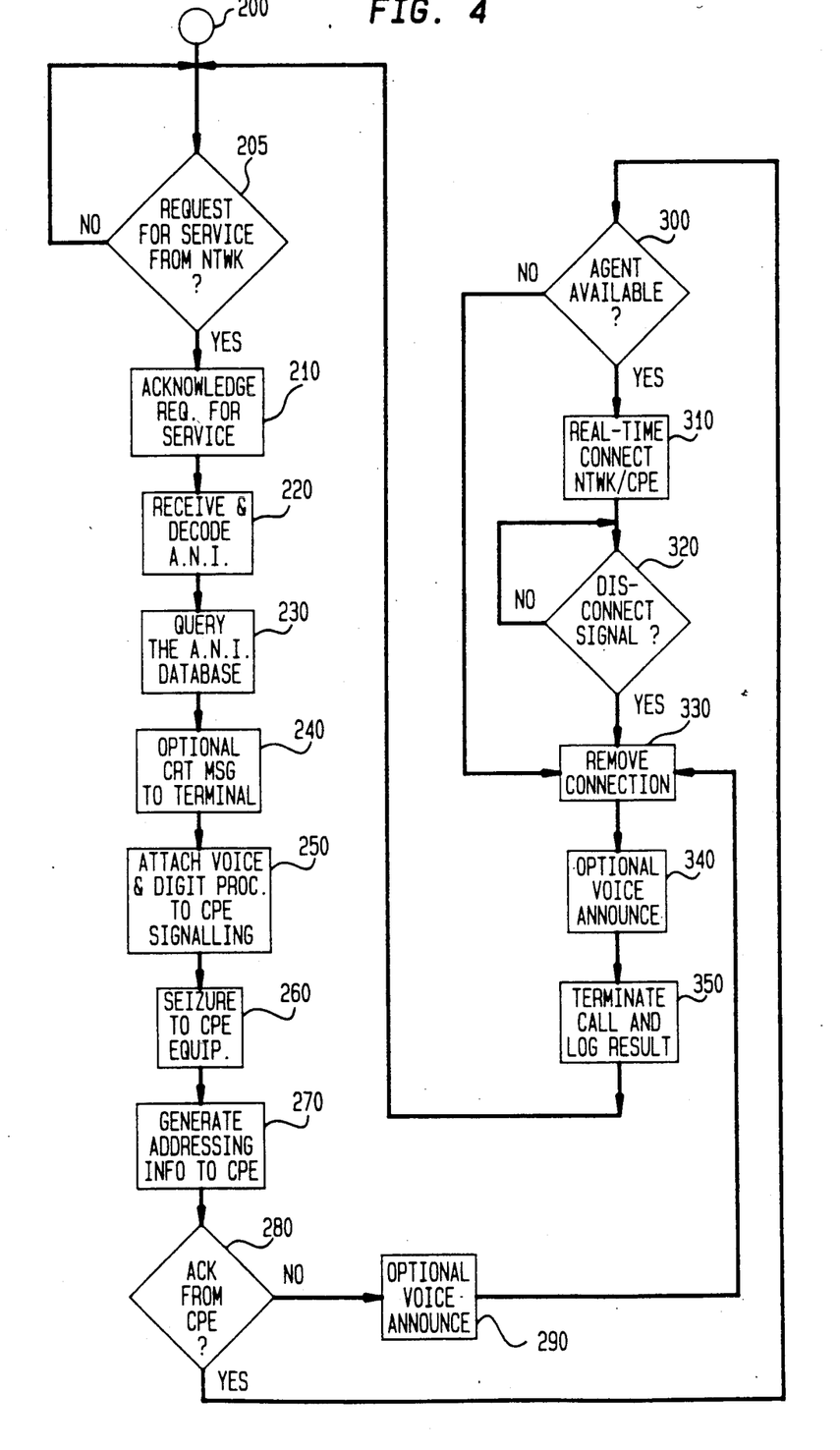
FIG. 4 shows, a flow chart of the operation of one embodiment of the inventive ACS in handling a telephone call from a calling party to a customer premises equipment.

The following describes the operation of ACS 100 for handling an incoming call with reference to FIG. 4. At point 200, ACS 100 is waiting for a request for service from a calling party over the PSTN. Such requests, as is well known to those of ordinary skill in the art, are typically made in the form of the application of a ringing signal in an analog interface to the PSTN or in the form of a signalling bit transition in a digital interface to the PSTN. Such requests are received, detected and decoded by NSI 140, see decision box 205. For example, NSI 140 may detect an incoming telephone call from a calling party customer who is requesting service from the business CPE by detecting loop current in a telephone line accessed by the calling party customer and by transmitting a message regarding the detection event to controller 180. NSI 140 transmits a message that a request for service has been detected to controller 180 over lines 185. At point 210, after receiving the message from NSI 140 that a request for service has been detected, controller 180 sends a command to CSM 150 over lines 145 to connect a voice and data processing circuit in VDPM 170 to the circuit in NSI 140 which has the request pending. Then, controller 180 sends a command to NSI 140 over lines 185 to cause it to acknowledge the request for service. Such acknowledgement as is well known in the art, generally takes the form of an "off hook" signal presented to the PSTN in an analog interface or such acknowledgement, as is well known in the art, generally takes the form of a momentary application of a signalling bit toward the PSTN in a digital interface.

As shown at point 220, VDPM 170 receives and decodes network routing and/or origination information signals that are sent from the PSTN. As is well known in the art, such network routing and/or origination information signals can take the form of dial pulse digits, dual tone multi-frquency (DTMF) digits, multi-frequency (MF) digits or common channel signalling. Such network routing and/or origination information signals will typically be present in DID (Direct-Inward-Dial), DNIS (Dialed-Number-Identification-Service), ANI (Automatic-Number-Identification) or ISDN (Integrated Services Digital Network) networks and are used, as is well known to those of ordinary skill in the art, to automatically identify the destination path for the call, the intended purpose for the call, and/or addressing information concerning the calling party.

As shown at point 230, controller 180, in conjunction with VDPM 170, has collected, for example, ANI information. If controller 180 is comprised of a local data base, it will retrieve a predetermined set of data from the local data base using at least a portion of the ANI information as a retrieval key. If, however, controller 180 is not comprised of a local data base, controller 180 will communicate with a remote data base in a host computer (not shown) via communications interface 190 and transmit at least a portion of the ANI information thereto. In one embodiment of the present invention, the host computer accesses the remote data base, retrieves predetermined data therefrom, and transmits at least a set of the predetermined data back to controller 180 over communications interface 190. In particular, the set of predetermined data may include data such as a specific CPE address of a workstation or operator that has been designated specifically to handle calls of a particular type or to handle a call from a particular class of calling parties. Further, the set of predetermined data may include the name, address, previous transaction history, purpose of the call and so forth for the particular calling party.

As shown at point 240, in this embodiment of the present invention, controller 180 transmits at least a portion of the predetermined set of data to a workstation over communications interface 190. Such information may be used by the workstation, for example, for displaying a message on a CRT screen for a human operator who will be connected to the calling party, which message may indicate the purpose of the call and present at least a portion of the predetermined data in a predetermined format to facilitate an efficient interaction between the calling party and the human operator For example, the workstation may present the data to the human operator at a predetermined time before the calling party is connected to the human operator or at some predetermined time during their interaction. As one can readily appreciate from this, in further embodiments of the present invention, the predetermined set of data retrieved from the remote data base may be transmitted directly to the workstation from the host computer without having to be rerouted through controller 180. Nevertheless, in either embodiment, the end result is that a human operator may interact with a calling party after data pertaining to that party is automatically provided for the human operator. As one can readily appreciate, this provides a substantial savings in the time required for transmittal of information between the calling party and the human operator. For example, a substantial savings in time can occur in an interaction wherein the calling party desires to make a purchase and the human operator automatically has been provided with the calling party's name and address.

At point 250, controller 180 commands CSM 150 to connect an available voice and data processing circuit from VDPM 170 to an available channel in CPESI 160—in this embodiment this advantageously permits VDPM 170 to perform the signalling. At point 260, controller 180 commands CPESI 160 to make a request for service from the business customer premises equipment (business CPE). For example, as is well known to those of ordinary skill in the art, such a request for service may comprise, for example, a ringing signal or a signalling bit state transition.

At point 270, controller 180 commands VDPM 170 to transmit address information over the path selected by CSM 150 towards CPESI 160. This addressing information may be comprised of some, all or none of the in-band network routing and/or origination information obtained from input line 120 at the start of the interaction and the addressing information may be comprised of at least a portion of the predetermined set of data retrieved from either the local or the remote data base. In accordance with the present invention, this addressing information may be useful in directing the business CPE to connect the calling party to a particular human operator or workstation that can best interact with the calling party. For example, the network routing and/or origination information, along with at least a portion of the predetermined set of data, may indicate that the calling party is to be connected with an operator who deals primarily with a specific type of transaction such as, for example, the purchase of a particular product or that the calling party only speaks a specific language such as, for example, Spanish. Further, the remote data base may have include information concerning which one of a multiplicity of appropriate operators which deal with a particular type of transaction are available. In such a case, the data transmitted to controller 180 would include addressing information for accessing such an operator.

At point 280 CPESI 160 awaits an acknowledgement from the business CPE of the request for service from CPESI 160. For example, as is well known to those of ordinary skill in the art, such acknowledgement may comprise an off-hook signal presented by the business CPE or it may comprise the momentary application of a signalling bit change toward CPESI 160. If CPESI 160 does not receive an acknowledgement from the business CPE, controller 180 transfers control to point 330 to terminate the interaction with the calling party or controller 180 may, at point 290, optionally command CSM 150 to connect a circuit from VDPM 170 to the active circuit in NSI 140 and command VDPM 170 to provide a voice announcement to the calling party that the call cannot be completed at this time. Controller 180 then transfers control to point 330 to terminate the interaction with the calling party.

If CPESI 160 receives an acknowledgement from the business CPE, controller 180 causes CPESI 160 and VDPM 170, if necessary, to complete answer supervision with the business CPE in a manner which is well known to those of ordinary skill in the art. At point 300, controller 180 may optionally wait to receive a signal from, for example, a remote host computer system over communications interface 190 to provide information that a human operator is available to service the calling party. If a human operator is not available for a predetermined length of time, control is transferred to point 330. If, however, a human operator is available, controller 180 may optionally command CSM 150 to connect a circuit from VDPM 170 to the active circuit in CPESI 160 and command VDPM 170 to provide a voice announcement to the human operator to aid in the call identification process (this optional step is not shown).

At point 310, controller 180 commands CSM 150 to disconnect any circuits in VDPM 170 which are connected to either the NSI 140 circuit or the CPESI 160 circuit and to connect the calling party interfaced with NSI 140 to the business CPE interfaced with CPESI 160. This provides a full connection or communications path between the calling party and the human operator or workstation.

As shown at point 320, this communications path remains intact until NSI 140 detects a disconnect signal from the PSTN indicating that the calling party has hung up or until CPESI 160 detects a disconnect signal from the business CPE indicating that the human operator or work station has hung up.

As shown at point 330, controller 180 commands CSM 150 to remove the connection between NSI 140 and CPESI 160 and commands NSI 140 and CPESI 160 to signal appropriate disconnects with the PSTN and the business CPE, respectively, by, for example, presenting "on hook" signals thereto. At point 340, optionally, controller 180 may command CSM 150 to connect a circuit from VDPM 170 to the active circuit in NSI 140 and command VDPM 170 to provide a voice announcement to the calling party that the call was terminated or controller 180 may command CSM 150 to connect a circuit from VDPM 170 to the active circuit in CPESI 160 to provide a voice announcement that the call was terminated. Optionally, the transaction is logged at point 350 and the operation continues at point 200 For example, such logging may include updating a local data base or updating a remote data base by transmitting transaction information thereto over communications interface 190. Such transaction information may include, without limitation, network routing and/or origination information, a predetermined set of the initially retrieved data, called party information, and call duration.

As one can readily appreciate from the above, ACS 100 conserves resources by automatically providing information which would otherwise have to be provided by an interaction between a calling party and an operator.

Note that the embodiment of the inventive ACS disclosed above takes advantage of a time-division-multiplex which is contained in the DTI/124 commercially available apparatus which may be used to embody CSM 50. However, the inventive ACS may also be implemented when one uses an equal number of NSI circuits, CPESI circuits and VDPM circuits. In such embodiments there may be no need for a connection and switching means because the various resources can be connected together on a one to one basis.

Further, those skilled in the art recognize that further embodiments of the present invention may be made without departing from its teachings. For example, the inventive ACS can be used with any application that requires an interface with a multiplicity of users and is not restricted to analog or digital interfaces over telephone lines. Still further, it should be clear to those of ordinary skill in the art that embodiments of the present invention are not restricted for use to an environment wherein the incoming calls originate from humans. In fact, embodiments of the present invention may operate advantageously in an environment wherein the incoming calls originate from machines such as, without limitation, FAX machines.

What is claimed is:

1. Apparatus for interfacing between a first telephone equipment and a second telephone equipment, which first telephone equipment outputs a first telephone call signal which is comprised of first in-band network routing and/or origination information, which apparatus comprises:

at least one network signalling interface for receiving the first telephone call signal in response to commands from a controller means;

at least one customer premises equipment signalling interface for sending a second telephone call signal comprised of second in-band network routing and/or origination information to the second telephone equipment in response to commands from the controller means;

at least one voice and data processing means which is switchably interconnected to at least one of the at least one network signalling interface and to at least one of the at least one customer premises equipment signalling interface: (a) for detecting the first in-band network routing and/or origination information, (b) for transmitting the first in-band network routing and/or originating information to the controller means, (c) for transmitting audio signals, in response to commands and information sent thereto from the controller means, to at least one of the at least one network signalling interface or to at least one of the at least one customer premises equipment signalling interface, and (d) for transmitting the second in-band network routing and/or origination information sent thereto from the controller means;

a connection and switching means, in response to commands from the controller means, for connecting and switching at least one of the at least one network signalling line interface to either at least one of the at least one voice and data processing means or at least one of the least one customer premises equipment signalling interface and for connecting and switching at least one of the at least one voice and data processing means to at least one of the at least one customer premises equipment signalling interface;

wherein the controller means comprises means which causes the apparatus: (a) to respond to the first telephone call signal input to one of the at least one network signalling interface and to detect and decode the first in-band network routing and/or origination information by interaction with the one of the at least one network signalling interface, one of the at least one voice and data processing means and the connection and switching means; (b) to obtain the second in-band network routing and/or origination information by retrieving information pertaining to a predetermined portion of the second telephone equipment from a data base system which uses at least a portion of the first in-band network routing and/or origination information as a retrieval key; and (c) to send the second telephone signal which is comprised of the second in-band network routing and/or origination information to the second telephone equipment by interaction with one of the at least one customer premises equipment signalling interface, the one of the at least one voice and data processing means, and the connection and switching means;

wherein at least a portion of the first in-band network routing and/or origination information is different from the second in-band network routing and/or origination information.

2. The apparatus of claim 1 wherein the controller means further comprises communications means for transmitting at least a portion of the information obtained from the data base to remote apparatus.

3. The apparatus of claim 1 wherein the controller means for obtaining the second in-band network routing and/or origination information comprises communications means for transmitting the at least a portion of the first in-band network routing and/or origination information to a remote data base and for receiving at least a portion of the second in-band network routing and/or origination information therefrom.

4. The apparatus of claim 3 wherein the controller means further comprises means which utilizes the communications means for sending information pertaining to the telephone interaction between the first telephone equipment and the second telephone equipment to the remote data base.

5. The apparatus of claim 3 wherein the controller means further comprises a local data base for retrieving and storing information.

6. The apparatus of claim 3 wherein the controller means further comprises a local data base is for retrieving and storing information pertaining to the first in-band network routing and/or origination information.

7. The apparatus of claim 1 wherein the controller means causes voice announcements to be made to the first telephone equipment by interaction with the one of the at least one network signalling interface, one of the at least one voice and data processing means and the connection and switching means.

8. The apparatus of claim 1 wherein the controller means causes voice announcements to be made to the second telephone equipment by interaction with the one of the at least one customer premises equipment signalling interface, the one of the at least one voice and data processing means, and the connection and switching means.

9. The apparatus of claim 1 wherein at least one of the at least one network signalling interface receives and places calls in digital form.

10. The apparatus of claim 1 wherein at least one of the at least one network signalling interface receives and places calls in analog form.

11. The apparatus of claim 1 wherein at least one of the at least one customer premises equipment signalling interface receives and places calls in digital form.

12. The apparatus of claim 1 wherein at least one of the at least one customer premises equipment signalling interface receives and places calls in analog form.

13. The apparatus of claim 1 wherein the connection and switching means connects and switches in digital form.

14. The apparatus of claim 1 wherein the connection and switching means connects and switches in analog form.

15. Apparatus for interfacing between a first telephone equipment and a second telephone equipment, which first telephone equipment outputs a first telephone call signal which is comprised of first in-band network routing and/or origination information, which apparatus comprises:

at least one network signalling interface for receiving the first telephone call signal in response to commands from a controller means, the at least one network signalling interface being connected to at least one customer premises equipment signalling interface for sending a second telephone call signal comprised of second in-band network routing and/or origination information to the second telephone equipment in response to commands from the controller means;

at least one voice and data processing means which is connected to the at least one network signalling interface and to the at least one customer premises equipment signalling interface; (a) for detecting the first in-band network routing and/or origination information, for transmitting the first network routing and/or origination information to the controller means, (c) for transmitting audio signals, in response to commands and information sent thereto from the controller means, to the at least one network signalling interface or to the at least one customer premises equipment signalling interface, and (d) for transmitting the second in-band network routing and/or origination information sent thereto from the controller means;

wherein the controller means comprises means which causes the apparatus: (a) to respond to the first telephone call signal input to one of the at least one network signalling interface and to detect and decode the first in-band network routing and/or origination information by interaction with the one of the at least one network signalling interface and one of the at least one voice and data processing means; (b) to obtain the second in-band network routing and/or origination information by retrieving information pertaining to a predetermined portion of the second telephone equipment from a data base system which uses at least a portion of the first in-band network routing and/or origination information as a retrieval key; (c) to send the second telephone signal which is comprised of the second in-band network routing and/or origination information to the second telephone equipment by interaction with one of the at least one customer premises equipment signalling interface and the one of the at least one voice and data processing means;

wherein at least a portion of the first in-band network routing and/or origination information is different from the second in-band network routing and/or origination information.

16. The apparatus of claim 15 wherein the controller means further comprises communications means for transmitting at least a portion of the information obtained from the data base to remote apparatus.

17. The apparatus of claim 15 wherein the controller means for obtaining the second in-band network routing and/or origination information comprises communications means for transmitting the at least a portion of the first in-band network routing and/or origination information to a remote data base and for receiving at least a portion of the second in-band network routing and/or origination information therefrom.

18. The apparatus of claim 17 wherein the controller means further comprises means which utilizes the communications means for sending information pertaining to the telephone interaction between the first telephone equipment and the second telephone equipment to the remote data base.

19. The apparatus of claim 17 wherein the controller means further comprises a local data base for retrieving and storing information.

20. The apparatus of claim 17 wherein the controller means further comprises a local data base for retrieving and storing information pertaining to the first in-band network routing and/or origination information.

21. The apparatus of claim 15 wherein the controller means causes voice announcements to be made to the first telephone equipment by interaction with the one of the at least one network signalling interface and one of the at least one voice and data processing means.

22. The apparatus of claim 15 wherein the controller means causes voice announcements to be made to the second telephone equipment by interaction with the one of the at least one customer premises equipment signalling interface and one of the at least one voice and data processing means.

23. The apparatus of claim 15 wherein at least one of the at least one network signalling interface receives and places calls in digital form.

24. The apparatus of claim 15 wherein at least one of the at least one network signalling interface receives and places calls in analog form.

25. The apparatus of claim 15 wherein at least one of the at least one customer premises equipment signalling interface receives and places calls in digital form.

26. The apparatus of claim 15 wherein at least one of the at least one customer premises equipment signalling interface receives and places calls in analog form.

27. Apparatus for interfacing between a first telephone equipment and a second telephone equipment, which first telephone equipment outputs a first telephone call signal which is comprised of first in-band network routing and/or origination information, which apparatus comprises:

means for receiving the first telephone call signal;

means for detecting and identifying the first in-band network routing and/or origination information;

means for obtaining second in-band network routing and/or origination information in response to the first in-band network routing and/or origination information; and     means for sending a second telephone call signal comprised of the second in-band network routing and/or origination information to the second telephone equipment;

wherein at least a portion of the first in-band network routing and/or origination information is different from the second in-band network routing and/or origination information.

28. Method for interfacing between a first telephone equipment and a second telephone equipment, which first telephone equipment outputs a first telephone call signal which is comprised of first in-band network routing and/or origination information, which method comprises the steps of:

receiving the first in-band telephone call signal;

detecting and identifying the first in-band network routing and/or origination information;

obtaining second in-band network routing and/or origination information in response to the first in-band network routing and/or origination information; and     sending a second telephone call signal comprised of the second in-band network routing and/or origination information to the second telephone equipment;

wherein at least a portion of the first in-band network routing and/or origination information is different from the second in-band network routing and/or origination information.

* * * * *